United States Patent [19]

Vaghela et al.

[11] Patent Number: 6,093,438
[45] Date of Patent: *Jul. 25, 2000

[54] MOLDED AERATED FROZEN BAR

[75] Inventors: Madansinh Vaghela, Marysville, Ohio; Tawfik Yousef Sharkasi, Cario, Egypt

[73] Assignee: Nestec S.A., Vevy, Switzerland

[*] Notice: This patent is subject to a terminal disclaimer.

[21] Appl. No.: 09/305,323

[22] Filed: May 5, 1999

Related U.S. Application Data

[63] Continuation-in-part of application No. 09/027,825, Feb. 20, 1998, Pat. No. 5,968,582.

[51] Int. Cl.$^7$ ................................ A23G 9/00; A23P 1/00
[52] U.S. Cl. ..................... 426/565; 426/566; 426/587; 426/588; 426/515; 426/519; 426/524
[58] Field of Search ..................... 426/565, 566, 426/587, 588, 515, 519, 524, 100, 101

[56] References Cited

U.S. PATENT DOCUMENTS

| | | | |
|---|---|---|---|
| 4,450,182 | 5/1984 | Stahl et al. | 426/565 |
| 4,542,035 | 9/1985 | Huang et al. | 426/565 |
| 4,724,153 | 2/1988 | Dulin et al. | 426/565 |
| 4,795,650 | 1/1989 | Groobert | 426/306 |
| 4,828,866 | 5/1989 | Wade et al. | 426/599 |
| 5,112,626 | 5/1992 | Huang et al. | 426/43 |
| 5,171,602 | 12/1992 | Martin et al. | 426/567 |
| 5,175,013 | 12/1992 | Huang et al. | 426/565 |
| 5,292,030 | 3/1994 | Kateman et al. | 222/1 |
| 5,343,710 | 9/1994 | Cathenaut et al. | 62/71 |
| 5,403,611 | 4/1995 | Tomita et al. | 426/565 |
| 5,472,726 | 12/1995 | Bee et al. | 426/565 |
| 5,486,373 | 1/1996 | Holt et al. | 426/565 |
| 5,758,571 | 6/1998 | Kateman et al. | 99/455 |

FOREIGN PATENT DOCUMENTS

| | | |
|---|---|---|
| 157594 | 10/1985 | European Pat. Off. . |
| 191487 | 8/1986 | European Pat. Off. . |
| WO 94/21138 | 9/1994 | WIPO . |
| WO 98/09536 | 3/1998 | WIPO . |

*Primary Examiner*—Nina Bhat
*Attorney, Agent, or Firm*—Pennie & Edmonds LLP

[57] ABSTRACT

A process for the production of a molded aerated frozen bar by preparing a mix of ingredients suitable for a frozen aerated bar, whipping the mix to obtain an aerated mix having an overrun of from between about 20% to about 250%, molding the aerated mix to give a molded aerated mix and freezing the molded aerated mix to produce the molded frozen aerated bar.

6 Claims, 1 Drawing Sheet

MOLDED AERATED FROZEN BAR

CROSS-REFERENCE TO RELATED APPLICATIONS

This application is a continuation-in-part of application Ser. No. 09/027,825 filed Feb. 20, 1998 now U.S. Pat. No. 5,968,582.

FIELD OF THE INVENTION

The present invention is directed to a method for preparing a molded aerated frozen bar and to a molded aerated frozen bar obtainable from the method.

BACKGROUND OF THE INVENTION

Traditionally, molded aerated frozen bars are manufactured by partially freezing an ice cream mix, water ice mix, or fruit juice mix in conventional batch or continuous freezers followed by pumping and filling the mix into molds of different shapes and sizes. During the last decade, a new generation of freezers has been developed which are equipped with pre-whippers that enable the mix to be pre-aerated before being partially frozen in the freezer. The molded products are usually quiescently frozen using a cold brine system at −30° to −40° C. If desired, after demolding, the molded products may be coated with chocolate or compound coating. Finally, the products are usually packaged and stored at about −30° C. until transport and distribution.

This traditional process for manufacturing molded aerated frozen bars has limitations. For example, the partial freezing of the mix in the freezer, followed by quiescent freezing in the molds, leads to the formation of an icy texture, loss of air, and formation of large air cells in the product having a size range of about 110–185 microns (Arbuckle, W. S. Ice Cream, Fourth Edition, 1986, Van Nostrand Reinhold, New York, p 234). Additionally, shrinkage of the products is often a problem. Moreover, when eating the product, a very cold feeling in the mouth is experienced. Furthermore, it is difficult to achieve more than 20% overrun in water ice products and a typical overrun is from 0 to 20% and usually is about 5%. It is very difficult to achieve more than 80% overrun and almost impossible to achieve an overrun of 120% or higher in finished ice cream products using conventional manufacturing.

Currently, there is no process that can produce very finely aerated molded frozen bars (e.g., those having an average air cell size of less than 50 microns) that are smooth in texture, do not suffer from shrinkage, do not give a very cold feeling in the mouth, and have a uniform appearance without large air pockets on the surface. Moreover, no process can produce an overrun of more than 20% for water ice products and an overrun between about 80 to about 250% for ice cream products. The present invention provides a process and product which overcomes these disadvantages.

SUMMARY OF THE INVENTION

The present invention relates to a process for the production of a molded aerated frozen bar comprising the steps of preparing a mix of ingredients suitable for preparing a frozen aerated bar, whipping the mix to obtain an aerated mix having an overrun of between about 20% to about 250%, molding the aerated mix to give a molded aerated mix, and freezing the molded aerated mix to form the molded aerated frozen bar. In this process, the mix can be an ice cream mix, a water ice mix, a fruit juice mix, a frozen yogurt mix, a sherbet mix, or a mixture thereof.

The mix of ingredients is typically prepared by combining the ingredients with shear mixing to disperse and solubilize them into a homogeneous mass, followed by homogenizing the mass and pasteurizing the homogenized mass. Also, the mix can be aged after pasteurization by storing at a temperature of from between about 0° C. to about 6°C. for between about 1 hour to about 24 hours. If desired, the mix can be colored and flavored before being aerating in a mixer at a temperature of between about 0° C. to about 12° C. to obtain the desired overrun. Preferably, the molding of the aerated mix is accomplished by directly feeding the aerated mix to a mold and freezing the aerated mix therein to produce the frozen molded bar, with the freezing being allowed to take place quiescently at a temperature between about −25° C. to about −45° C.

The invention also relates to a molded aerated frozen bar having an overrun of from between about 20% to about 250% and containing air cells having an average size of less than about 50 microns which cells are uniformly distributed throughout the bar and which are substantially invisible to the naked eye, the bar having a smooth texture similar to an extruded bar, warm eating quality and quick melt with substantially no lingering of product in the mouth.

The molded aerated frozen bar can be a water ice product having an overrun of from between about 25% to about 150% or a an ice cream product having an overrun of from between about 40% to about 200%. If desired, the product can contain inclusions or have a coating that optionally contains inclusions. Further, the molded aerated bar can be a shell and core products with ice cream as a core and ice water, fruit juice, fruit ice, real fruit, or a mixture thereof as a shell. The latter having an overrun of between about 0% to about 20%. Optionally, the molded aerated bar can have a coating or a compound coating.

BRIEF DESCRIPTION OF THE DRAWINGS

In the accompanying drawings, FIG. 1 illustrates ice crystals in a conventionally molded aerated ice cream bar after heat shock while

DETAILED DESCRIPTION OF THE INVENTION

Figure 1:
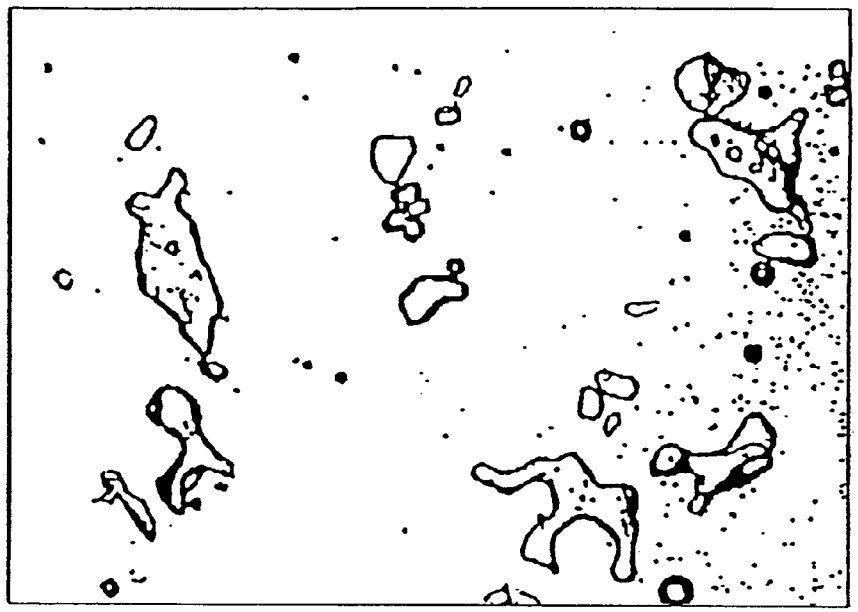

It has now been found that, an aged water ice or ice cream mix can be finely aerated in a whipper, e.g., an Oakes commercial whipper, to a desired overrun followed by direct depositing of the aerated mass into molds. This procedure eliminates the partial freezing step of the prior art and provides a molded frozen product that has a fine aerated texture. Furthermore, an unconventionally high overrun of above about 20% can be achieved for a water ice product and between about 80% to about 250% for an ice cream product. Moreover, the products have a significantly higher resistance to shrinkage and heat shock, have a smoother uniform air pocket free appearance, and a creamier and more desirable eating quality compared to conventionally prepared products.

The mix suitable for a frozen bar may be any conventional mix such as an ice cream mix, a water ice mix, a fruit juice mix, a frozen yogurt mix or a sherbet mix. An ice cream mix may contain fat, non-fat milk solids, carbohydrates, or stabilizers together with water and, if desired, other conventional ingredients such as emulsifiers, mineral salts, colorants, flavorings, inclusions, etc. A water ice mix is typically made of fruit juice, sugar, and stabilizers, with or without flavoring, coloring agents, inclusions and water. A fruit juice mix is similar to a water ice mix except that additional fruit juice is added. A sherbet mix comprises fruit juices, sugar, stabilizer, and small amounts of milkfat and non-fat milk solids.

A typical ice cream mix may contain fat in an amount of between about 3% to about 18% by weight based on the total weight of the mix, non-fat milk solids in an amount of between about 8% to about 15% by weight based on the total weight of the mix, sugar in an amount of between about 10% to about 15% by weight based on the total weight of the mix, a sweetener in an amount of between about 3% to about 8% by weight based on the total weight of the mix, and a stabilizer in an amount of between about 0.1% to about 1% by weight based on the total weight of the mix.

The fat used may be a dairy fat, a non-dairy fat, or a mixture of both. When the fat is a dairy fat, it may be for instance, any milk fat source such as butter oil, butter, real cream, or a mixture thereof. When the fat is a non-dairy fat it may be, for instance, an edible oil or fat, preferably a vegetable oil such as coconut oil, palm kernel oil, peanut oil, olive oil, soy bean oil, etc., or mixtures thereof.

The sugar used may be sucrose, glucose, fructose, lactose, dextrose, invert sugar either crystalline or liquid syrup form, or mixtures thereof.

The sweetener may be a corn sweetener in either a crystalline form of refined corn sugar (dextrose and fructose), a dried corn syrup (corn syrup solids), a liquid corn syrup, a maltodextrin, or a mixture thereof.

The stabilizer may be, for instance, a hydrocolloid such as agar, gelatin, gum acacia, guar gum, gum tragacanth, carrageenan and its salts, carboxymethyl cellulose, sodium alginate or propylene glycol alginate, or any mixture of stabilizers. Advantageously one or more emulsifiers may be present also.

A typical process for the preparation of a frozen molded bar can be carried out using conventional equipment. The first step comprises mixing the ingredients under shear mixing to disperse and solubilize the ingredients into a homogeneous mass. One of ordinary skill in the art with little or no experimentation can determine mixing time and conditions to obtain the desired homogeneous mass.

Thereafter, the homogeneous mass is preheated, e.g., to a temperature of between about 62° C. to about 75° C. The preheated homogeneous mass is homogenized, e.g., in a two stage homogenizer. The first stage is conducted at a pressure between about 500 psig to about 3500 psig., preferably between about 1000 psig to about 3000 psig. The second stage is conducted at a pressure between about 0 psig to about 1000 psig, preferably between about 100 psig to about 800 psig. Subsequently, pasteurization of the homogenized mass is conducted under conditions commonly used in the industry. Preferably, pasteurization is conducted by either high temperature short time (HTST) or lot temperature low time (LTLT) processing.

After pasteurization, the mix is preferably aged by allowing to stand at a temperature of between about 0°C. to about 6° C., preferably between about 1° C. to about 5° C. for between about 1 hour to about 24 hours, more usually between about 2 hours to about 18 hours and preferably between about 4 hours to about 12 hours.

The mix is then colored and flavored as needed, aerated in a mixer. Any mixer commonly used in the industry can be used to aerate the mixture, e.g. an Oakes Mixer, Mondo-Mix, Aero-Mix, GEI-Whipper, etc. The speed of aeration is dependent upon the size of the mixer, one of ordinary skill in the art can select the best conditions to aerate any mixture by conducting routine tests. Mixer speed includes ranges between about 10 L/h to about 1000 L/h, preferably 300 L/h to about 500 L/h. Mixer head speed includes ranges between about 300 rpm to about 3000 rpm, preferably 400 rpm to about 1000 rpm.

Aeration should be conducted at a temperature of from between about 0° C. to about 12° C., preferably from between about 1° C. to about 5° C., and with a back pressure of about between about 20 psig to about 80 psig, preferably from between about 25 psig to about 60 psig, to obtain the desired overrun. Preferably the overrun for water ice products is from between about 25% to about 150%, more preferably from between about 30% to about 100% and especially from between about 50% to about 80%. Preferably the overrun for ice cream products is from between about 40% to about 200%, more preferably from between about 80% to about 150%, and especially from between about 100% to about 140%.

The aerated mix is then fed, preferably directly, to a mold, e.g., by pumping through a filler, and then allowed to freeze to give the frozen molded bar. The freezing may be allowed to take place quiescently at a temperature of from, between about −25° C. to about −45° C., preferably from between about −30° C. to about −40° C., conveniently using cold brine or other conventionally acceptable methods.

The frozen aerated molded bar may afterwards be demolded and then packaged and stored at a freezing temperature, usually at between about −25° C. to about −35° C., preferably between about −28° C. to about −32° C., and more preferably at 30° C. If desired, after demolding, the frozen molded bar may be coated, for instance with chocolate or a compound coating. Compound coatings include coatings which do not contain 100% cocoa fat and coatings that contain any vegetable oil, such as canola oil, corn oil, soy oil, coconut oil, etc., or mixtures thereof. These coatings may also contain inclusions such as nut pieces, fruit pieces, rice crisps, or other additives therein. The molded bar is then packaged and stored at a freezing temperature.

The frozen molded bar produced by the process of the present invention may have a creamier and warm eating quality of an extruded product, and a smooth, uniform, homogeneous texture and appearance, with small air cells of an average size of less than about 50 microns uniformly distributed substantially none of which are visible to the naked eye. The molded aerated frozen bar may have a quick melt with substantially no lingering of product in the mouth, the ice crystals having a unique thin and substantially curved rod like shape and an average size of less than ice crystals in a conventionally molded aerated frozen bar after heat shock, and having improved heat shock and shrinkage resistance.

Optionally, the frozen molded bar may further comprise a coating or shell. The coating or shell material includes fruit juice, fruit ice, real fruit, water ice, or mixtures thereof. The shell may also have an overrun of between about 0% to about 20%.

To summarize, the molded aerated frozen bar produced by the process of the present invention has a texture which is smoother, creamier and has a warmer mouth feel than a conventionally molded aerated frozen bar even at lower overruns, e.g., a water ice product having an overrun of about 20% and an ice cream product having an overrun of about 50%. The present invention also provides a molded aerated frozen bar having an overrun of between about 20% to about 250% with small air cells uniformly distributed substantially none of which are visible to the naked eye, e.g., a water ice product having an overrun of from between about 20% to about 150% and an ice cream product having an overrun of from between about 50% to about 200%.

Figure 2:
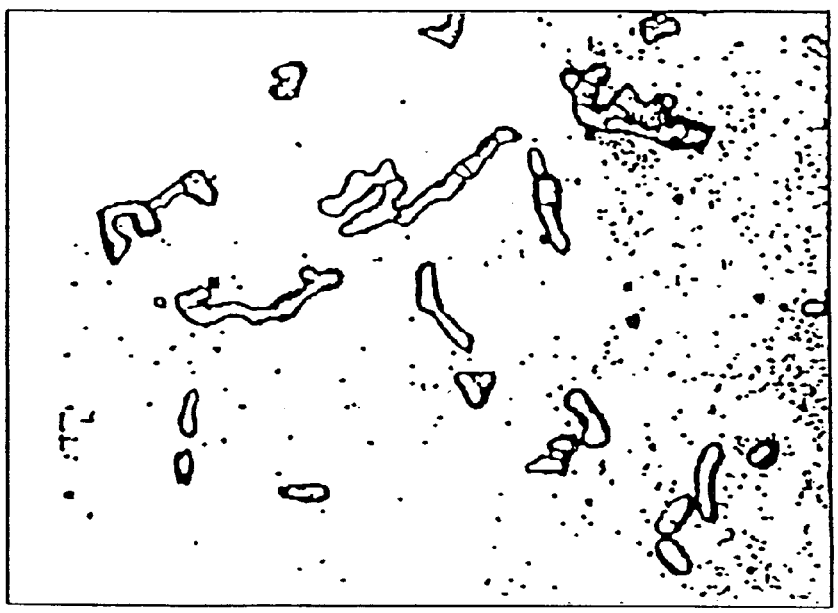
FIG. 2 illustrates ice crystals in a molded aerated ice cream bar made by the process of the present invention after heat shock.

FIG. 1 illustrates the ice crystals of a conventionally prepared molded aerated ice cream bar after heat shock, taken with a microscope at −20° C. The ice crystals are substantially larger and straighter in shape. FIG. 2 illustrates the ice crystals of a frozen molded bar prepared as taught by the present invention taken with a microscope at −20° C. FIG. 2 shows that the ice crystals in products produced according to the present invention are thinner than ice crystals of conventionally prepared frozen bars and of a substantially curved rod like shape.

EXAMPLES

The following Examples and accompanying drawings further llustrate the present invention.

Example 1

An ice cream mix was prepared from 8% (by weight) partially hydrogenated palm kernel oil, 11% nonfat milk solids, 12% sucrose, 6% corn syrup solids (36DE) and 0.5% of a stabilizer blend containing combinations of hydrocolloids such as guar, locust bean gum, carrageenan, carboxymethyl cellulose, etc. together with emulsifiers. The ingredients were mixed with agitation to disperse and solubilise them into a homogeneous mass, homogenized with a two stage homogenizer at 2000 psig pressure at the first stage and 500 psig pressure at the second stage, followed by HTST pasteurization.

After pasteurization, the mix was aged by refrigerated storage at a temperature of 4° C. for 6 hours.

The aged mix was colored, flavored, and then aerated in an Oakes Mixer at a temperature of 4° C. to an overrun of 130%.

The aerated mix was pumped to a mold and allowed to freeze to give the frozen molded bar. The freezing was allowed to take place quiescently at a temperature of −40° C. using cold brine.

The frozen molded bar produced by the process of the present invention had a creamier and warm eating quality of an extruded product, a smooth, uniform, homogeneous texture and appearance, with small air cells of an average size of less than 50 microns uniformly distributed substantially none of which were visible to the naked eye. The molded aerated frozen bar may have a quick melt with substantially no lingering of product in the mouth. Ice crystals in the molded aerated frozen bar had a unique thin and substantially curved rod like shape and an average size of less than ice crystals in a conventionally molded aerated ice cream bar after heat shock, and had improved heat shock and shrinkage resistance. The frozen molded bar was demolded and subsequently coated with chocolate crunch bar at 35° C., ackaged, and stored at −20° C.

Example 2

A water ice mix was prepared from 23% (by weight) sucrose, 7% corn syrup solids (36 DE) and 0.6% stabilizer blend containing combinations of hydrocolloids, such as guar, locust bean gum, pectin, carboxymethyl cellulose, gelatin, microcrystalline cellulose, hydrolyzed soy or milk proteins, etc. with or without emulsifiers. The ingredients were mixed with agitation to disperse and solubilise them into a homogeneous mass in water, homogenized with a two stage homogenizer at 1500 psig pressure at the first stage and 500 psig pressure at the second stage, followed by HTST pasteurization.

After pasteurization, the mix was aged by refrigerated storage at a temperature of 4° C. for 6 hours.

The aged mix was colored, flavored, acidified (e.g. adding citric acid solution), and then aerated in an Oakes Mixer at a temperature of 4° C. to an overrun of 100%.

The aerated mix was then pumped to a mold and then allowed to freeze to give the frozen molded bar. The freezing was allowed to take place quiescently at a temperature of −40° C. using cold brine The frozen molded bar produced by the process of the present invention had the creamier and warm eating quality of an extruded product, a smooth, uniform, homogeneous texture and appearance, substantially none of which were visible to the naked eye. The molded aerated frozen bar had a quick melt with substantially no lingering of product in the mouth. The frozen molded bar was demolded, and then packaged and stored at −30° C.

What is claimed is:

1. A molded aerated frozen bar having an overrun of from between about 20% to about 250% and containing air cells having an average size of less than about 50 microns which cells are uniformly distributed throughout the bar and which are substantially invisible to the naked eye, the bar having a smooth texture similar to an extruded bar, warm eating quality, the bar having heat-shock and shrinkage resistance, and quick melt with substantially no lingering of product in the mouth.

2. The molded aerated frozen bar according to claim 1 comprising a water ice product having an overrun of from between about 25% to about 150%.

3. The molded aerated frozen bar according to claim 2 wherein the water ice product contains inclusions.

4. The molded aerated frozen bar according to claim 1 comprising an ice cream product having an overrun of from between about 40% to about 200%.

5. The molded aerated frozen bar according to claim 4 which further comprises a coating or shell having an overrun of between 0% to about 20%.

6. The molded aerated frozen bar according to claim 5 wherein the coating is a compound coating.

* * * * *